United States Patent Office 3,809,720
Patented May 7, 1974

3,809,720
BIS/PARA(AMINO-LOWERALKYLENEOXY)
PHENYL/ALKANOLS AND THE SALTS
THEREOF
Josef Fried, Chicago, Ill., and Edward J. Pribyl, Metuchen, and John Krapcho, Somerset, N.J., assignors to E. R. Squibb & Sons, Inc., New York, N.Y.
No Drawing. Continuation-in-part of application Ser. No. 793,612, Jan. 23, 1969, which is a continuation-in-part of application Ser. No. 566,245, July 19, 1966, which in turn is a continuation-in-part of application Ser. No. 288,630, June 18, 1963, all now abandoned. This application Sept. 30, 1970, Ser. No. 77,037
Int. Cl. C07c 93/06
U.S. Cl. 260—570 R    5 Claims

ABSTRACT OF THE DISCLOSURE

This application relates to alcohols of the general formula

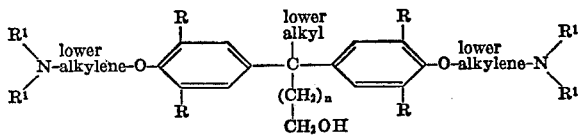

and to acid addition salts thereof. These substances inhibit cholesterol biosynthesis and aid in the regulation of cholesterol in the blood.

---

This application is a continuation-in-part of application Ser. No. 793,612 filed Jan. 22, 1969, which is in turn a continuation-in-part of application Ser. No. 566,245, filed July 19, 1966, which is in turn a continuation-in-part of application Ser. No. 288,630, filed June 18, 1963, all of which are now abandoned.

SUMMARY OF THE INVENTION

This invention relates to new compounds of the formula (I)
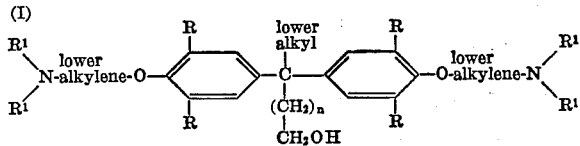

and to acid addition salts thereof.

The symbols in Formula I have the following meanings:

R represents hydrogen, lower alkyl, lower alkoxy or halo.
$R^1$ represents hydrogen, lower alkyl, phenyl-lower alkyl, hydroxyalkyl.
$n$ is 1 to 6.

The lower alkyl groups represented by the symbols referred to above include straight and branched chain saturated aliphatic groups having from one to about seven carbon atoms such as methyl, ethyl, propyl, isopropyl, butyl, isobutyl, t-butyl, amyl, isoamyl, hexyl, and the like. Methyl and ethyl are preferred. The lower alkoxy groups contain alkyl groups of the same character attached to an oxygen atom. Similarly, the lower alkylene groups are divalent radicals of the same kind.

Each of the four halogens is contemplated by the term "halo," but chlorine and bromine are preferred.

In the basic nitrogen containing radicals represented by each group.

each $R^1$ can be the same or different and represents hydrogen, lower alkyl, hydroxy-lower alkyl, phenyl-lower alkyl and N-(lower alkyl)phenyl(lower alkyl), forming such basic groups as amino, lower alkylamino, e.g., methylamino, ethylamino, di(lower alkyl)amino, e.g., dimethylamino, methylethylamino, dipropylamino (hydroxy-lower alkyl)amino, e.g., hydroxyethylamino, di(hydroxy-lower alkyl)amino, e.g., di(hydroxyethyl)amino, phenyl(lower alkyl)amino, e.g., benzylamino, phenethylamino, N-(lower alkyl)phenyl-(lower alkyl)amino, e.g., N-methylbenzylamino, and the like.

DETAILED DESCRIPTION OF THE INVENTION

The new compounds of this invention may be produced from esters of the formula (III)
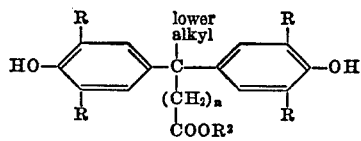

wherein $R^2$ is lower alkyl. These esters (III) are prepared by condensing the appropriate phenol with a keto ester as described in J. Org. Chem. 23, 1004 (1958).

The basic group is introduced by reacting the ester of Formula III with about two proportions of a halide of the formula (IV)
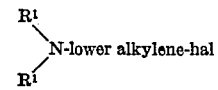

Preferably a chloride or bromide is the halogen represented by hal, although it is not necessary to be limited to those two.

The resulting ester has the formula (V)
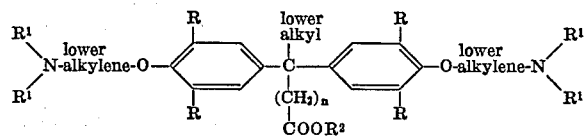

Alternatively, the ester of Formula III can be reacted with a dihalide (hal-lower alkylene-hal) to form a haloalkylene ether which is reacted with an amine

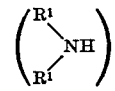

to form the ester of Formula V.

Hydrolysis of the compound of Formula V yields the corresponding acid ($R^2$=H).

Treatment of the ester or acid of Formula V with a reducing agent such as lithium aluminum hydride yields an alcohol of Formula I.

The bases of Formula I form acid addition salts by reaction with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, malate, citrate, succinate, benzoate, pamoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The new compounds of this invention are therapeutically active substances which are useful as hypochloestermic agents. They inhibit cholesterol biosynthesis and regulate the cholesterol in the blood of warm-blooded animals such as rats and the like. Thus they are useful in the treatment of conditions such as atherosclerosis. These products may be administered orally or parenterally, e.g., at a dosage level of 2 to 40 mg./kg./day in single or divided doses, preferably 1 to 10 mg./kg. orally two to four times daily, in the form of tablets, capsules, elixirs, injectables, or the like by incorporating the base of Formula I or a physiologically acceptable acid addition salt thereof in a conventional vehicle prepared with suitable vehicle, excipient, lubricant, flavor, etc., according to accepted pharmaceutical practice.

The following examples are illustrative of the invention. All temperatures are expressed on the centigrade scale.

EXAMPLE 1

(A) 4,4-bis[p-(2-diethylaminoethoxy)phenyl]valeric acid, ethyl ester

A solution of 99.0 (0.32 mole) of 4,4-bis(p-hydroxyphenyl)valeric acid, ethyl ester in 200 ml. of dimethylformamide is treated portionwise with 30 g. (0.63 mole) sodium hydride (50 percent dispersion). The reaction is exothermic and the temperature of the mixture is maintained below 60° by cooling. After completion of the addition of the hydride, the slurry is heated to 80°, cooled to 40° and treated with 290 ml. of 2.2 N 2-diethylaminoethyl chloride (0.63 mole) in toluene. This mixture is gradually heated and then maintained at 100–110° for three hours. The major portion of the solvent is removed under reduced pressure; the residue is treated with 200 ml. of water and then extracted twice with 600 ml. portions of ether. The ether phases are combined and shaken with (1) 100 ml. of 5 percent sodium bicarbonate solution and (2) 50 ml. of water. The ether phase is dried over magnesium sulfate, charcoal is added and the mixture filtered. The filtrate is concentrated under reduced pressure to give 146 g. of syrupy material. A solution of 125.7 g. of the above material in 600 ml. of ether is added to a cold solution of 50 ml. of concentrated hydrochloric acid in 300 ml. of water. The mixture is shaken, the organic phase is discarded and the aqueous phase is washed and treated with a cold solution of 30 g. of sodium hydroxide in 100 ml. of water. The organic phase is extracted with 400 ml. portions of ether (three times). The ether phases are combined, dried over magnesium, sulfate, filtered and the filtrate concentrated under reduced pressure to give 91.3 g. (66 percent) of pale orange syrupy product.

(B) 4(4-bis[p-(2-diethylaminoethoxy)phenyl]pentanol

The ester of Example 1(A) (25 g.) is dissolved in ether and added dropwise to an ethereal solution of 1.5 g. of lithium aluminum hydride. The mixture is refluxed for two hours, cooled and treated with a small quantity of sodium hydroxide solution. The ethereal solution of the product, 4,4 - bis[p-(2-diethylaminoethoxy)phenyl]pentanol, is decanted from the inorganic salts, dried over magnesium sulfate, filtered and the solvent evaporated to give 17.7 g. of the product.

EXAMPLE 2

(A) 4,4-bis[p-(2-dimethylaminoethoxy)phenyl]valeric acid, methyl ester

Sixty grams (0.2 mole) of 4-4-bis(p-hydroxyphenyl)-valeric acid, methyl ester, 20 g. (0.42 mole) of 50 percent sodium hydride and 250 ml. of 1.7 N 2-dimethylaminoethyl chloride (0.42 mole) in toluene are reacted in 175 ml. of dimethylformamide as described in Example 1(A). The bulk of solvents is removed in vacuo on a rotary evaporator at 70° and the cooled residue is shaken with 150 ml. of water and 400 ml. of ether. The layers are separated and the aqueous phase extracted twice more with 200 ml. portions of ether. The combined ether layers are washed with 100 ml. of water and added to a cold solution of 38 ml. of concentrated hydrochloric acid in 400 ml. of water to obtain crude hydrochloride. After shaking, the layers are separated and the aqueous phase is washed wiht ether, cooled and treated with a cold solution of 20 g. of sodium hydroxide in 100 ml. of water. The liberated base of the ether gives 48.5 g. (55 percent) of syrupy material.

(B) 4,4-bis[p-(2-dimethylaminoethoxy)phenyl]pentanol

By treating 4,4-bis[p-(2-dimethylaminoethoxy)phenyl] valeric acid, methyl ester according to the procedure of Example 1(B), 4,4-bis[p-(2-dimethylaminoethoxy)phenyl]pentanol is obtained. Treatment of this product, dissolved in ethanol, with two equivalents of hydrogen chloride gives the dihydrochloride salt.

EXAMPLE 3

3,3-bis[p-(2-diethylaminoethoxy)phenyl]butanol

Following the procedure of Example 1(A) but substituting an equivalent quantity of 3,3-bis(p-hydroxyphenyl) butyric acid, ethylester for the 4,4-bis(p-hydroxyphenol)valeric acid, ethyl ester, 3,3-bis[p-(2-diethylaminoethoxy) phenyl]butyric acid, ethyl ester is obtained. Treatment of this product according to the procedure of Example 1(B) gives the butanol.

EXAMPLE 4

5,5-bis[p-(2-diethylaminoethoxy)phenyl]hexanol

Following the procedure of Example 1(A) but substituting an equivalent quantity of 5,5-bis(p-hydroxyphenyl) hexanoic acid, propyl ester for the 4,4-bis(p-hydroxyphenyl)valeric acid, ethyl ester, 5,5-bis[p-(2-diethylaminoethoxy)phenyl]hexanoic acid, propyl ester is obtained. Treatment of this product according to the procedure of Example 1(B) gives the hexanol.

EXAMPLES 5 TO 9

Using the procedure of Example 1 but replacing the 4,4-bis(p-hydroxyphenyl)valeric acid, ethyl ester by the corresponding esters of (A) 4,4-bis(3-methyl-4-hydroxyphenyl)valeric acid,
(B) 4,4-bis(3-ethoxy-4-hydroxyphenyl)valeric acid,
(C) 4,4-bis(3-chloro-4-hydroxyphenyl)valeric acid,
(D) 4,4-bis(3,5-dimethyl-4-hydroxyphenyl)valeric acid,
(E) 4,4-bis(3-bromo-4-hydroxyphenyl)valeric acid, respectively, there is obtained, respectively:

4,4-bis[4-(2-diethylaminoethoxy)-3-methylphenyl]valeric acid, ethyl ester.
4,4-bis[4-(2-diethylaminoethoxy)-3-ethoxyphenyl]valeric acid, ethyl ester.
4,4-bis[4-(2-diethylaminoethoxy)-3-chlorophenyl]valeric acid, ethyl ester.
4,4-bis[4-(2-diethylaminoethoxy)-3,5-dimethylphenyl] valeric acid, ethyl ester.
4,4-bis[4-(2-diethylaminoethoxy)-3-bromophenyl]valeric acid, ethyl ester.

Treatment of each of the foregoing esters according to the procedure of Example 1(B) gives the following products:

Example 5, 4,4-bis[4-(2-diethylaminoethoxy)-3-methylphenyl]pentanol.
Example 6, 4,4-bis[4-(2-diethylaminoethoxy)-3-ethoxyphenyl]pentanol.
Example 7, 4,4-bis[4-(2-diethylaminoethoxy)-3-chlorophenyl]pentanol.
Example 8, 4,4-bis[4-(2-diethylaminoethoxy)-3,5-dimethylphenyl]pentanol.
Example 9, 4,4-bis[4-(2-diethylaminoethoxy)-3-bromophenyl]pentanol.

EXAMPLES 10 TO 13

Using the procedure of Example 1, but replacing the N-2-diethylaminoethyl chloride by the aminoalkylene halide shown in column 1 of Table I and replacing the 4,4-bis(p-hydroxy phenyl) valeric acid, ether ester with the acid ester shown in column 2 of Table I, there is obtained the esters which are treated as described in Example 1(B) to form the products of the invention shown in column 3 of Table I.

TABLE I

1

$$\mathrm{R^1\diagdown\atop R^1\diagup}N-\text{lower alkylene}-\text{Hal}$$

2

$$HO-\underset{R}{\overset{R}{\bigcirc}}-\underset{(\overset{|}{C}H_2)_n}{\overset{\text{lower alkyl}}{\underset{|}{C}}}-\underset{R}{\overset{R}{\bigcirc}}-OH$$
$$\text{COOR}^3$$

| Ex. No. | R¹ | Lower alkylene | Hal | R | Lower alkyl | R² | n |
|---|---|---|---|---|---|---|---|
| 10 | i-C₃H₇ | (CH₂)₃ | Cl | CH₃ | CH₃ | CH₃ | 5 |
| 11 | ⟨phenyl⟩-CH₂— | (CH₂)₄ | Br | C₂H₅O | CH₃ | C₂H₅ | 6 |
| 12 | ⟨phenyl⟩-C₂H₄— | (CH₂)₅ | I | Cl | C₂H₅ | C₃H₇ | 4 |
| 13 | HOC₂H₄— | CH₂ | Cl | Br | C₃H₇ | C₄H₉ | 1 |

3

$$\mathrm{R^1\diagdown\atop R^1\diagup}N-\text{lower alkylene}-O-\underset{R}{\overset{R}{\bigcirc}}-\underset{\underset{CH_2OH}{\overset{|}{(CH_2)_n}}}{\overset{\text{lower alkyl}}{\underset{|}{C}}}-\underset{R}{\overset{R}{\bigcirc}}-O-\text{lower alkylene}-N\mathrm{\diagup R^1\atop \diagdown R^1}$$

| Ex. No. | R¹ | Lower alkylene | R | Lower alkyl | n |
|---|---|---|---|---|---|
| 10 | i-C₃H₇ | (CH₂)₃ | CH₃ | CH₃ | 5 |
| 11 | ⟨phenyl⟩-CH₂— | (CH₂)₄ | C₂H₅O | CH₃ | 6 |
| 12 | ⟨phenyl⟩-C₂H₄— | (CH₂)₅ | Cl | C₂H₅ | 4 |
| 13 | HOC₂H₄— | CH₂ | Br | C₃H₇ | 1 |

What is claimed is:

1. A compound of the formula

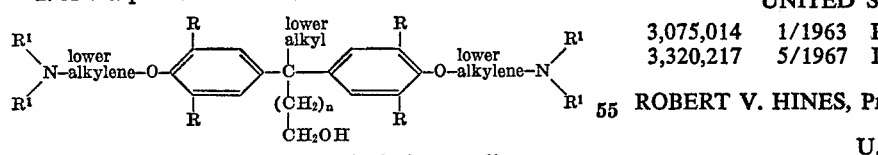

wherein R is hydrogen, lower alkyl, lower alkoxy, or halo; each R¹ is the same or different and is selected from the group consisting of hydrogen, lower alkyl, hydroxy-lower alkyl, phenyl-lower alkyl, N-(lower alkyl) phenyl (lower alkyl); n is an integer from 1 to 6 and acid addition salts thereof.

2. A compound according to claim 1 wherein each R is hydrogen and each R¹ is lower alkyl.

3. A compound according to claim 1 wherein each R is hydrogen, each R¹ is lower alkyl, each lower alkylene group has two carbon atoms, the lower alkyl group has one carbon atom and n is 2.

4. A compound according to claim 3 wherein each R¹ is ethyl.

5. A compound according to claim 3 wherein each R¹ is methyl.

References Cited
UNITED STATES PATENTS

| | | | |
|---|---|---|---|
| 3,075,014 | 1/1963 | Palopoli et al. | 260—570 |
| 3,320,217 | 5/1967 | Lednicer | 260—507.7 X |

ROBERT V. HINES, Primary Examiner

U.S. Cl. X.R.

260—253, 343.7, 473 S, 501.18, 501.19, 519, 570.8 R, 570.9, 577; 424—316, 330